United States Patent
Schueren

(10) Patent No.: US 7,911,093 B2
(45) Date of Patent: Mar. 22, 2011

(54) CONVERTER MOTOR

(75) Inventor: Volker Schueren, Marktheidenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 478 days.

(21) Appl. No.: 11/865,100

(22) Filed: Oct. 1, 2007

(65) Prior Publication Data

US 2008/0084141 A1    Apr. 10, 2008

(30) Foreign Application Priority Data

Oct. 4, 2006   (DE) .................. 10 2006 047 269

(51) Int. Cl.
*H02K 11/00* (2006.01)

(52) U.S. Cl. ........................ 310/68 R; 310/89

(58) Field of Classification Search ............... 310/89, 310/68 R, 88

See application file for complete search history.

(56) References Cited

U.S. PATENT DOCUMENTS

| | | | |
|---|---|---|---|
| 5,714,816 A * | 2/1998 | Jensen et al. | 310/89 |
| 5,920,134 A * | 7/1999 | Mayer et al. | 310/40 MM |
| 6,091,174 A * | 7/2000 | Genster | 310/89 |
| 6,169,345 B1 * | 1/2001 | Bloch et al. | 310/67 R |

* cited by examiner

*Primary Examiner* — Nguyen N Hanh
(74) *Attorney, Agent, or Firm* — Michael J. Striker

(57) ABSTRACT

In a converter motor, the converter unit and the electric motor together form a mechatronic unit. The converter unit is located behind the electric motor and is thermally coupled with the rear bearing shield. The converter unit includes a through hole, through which the rear end of the motor shaft passes. A contactless position detector is located in the region of this through hole.

17 Claims, 3 Drawing Sheets

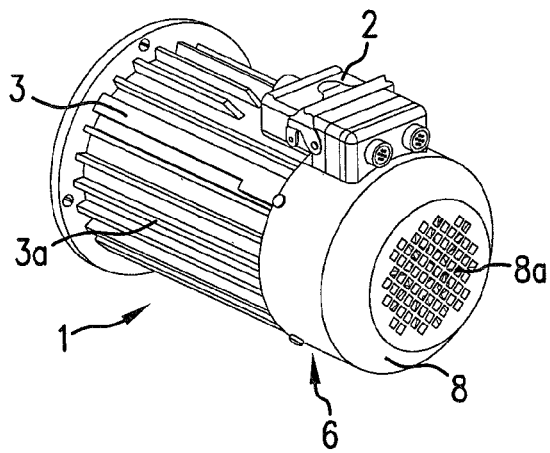
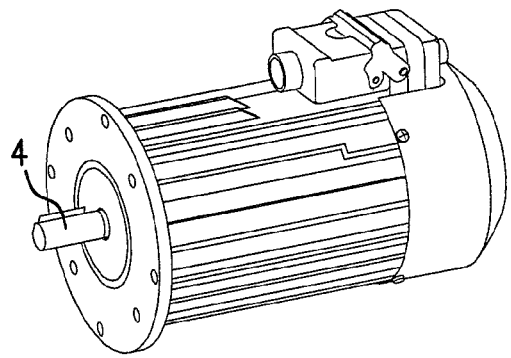
FIG.1A  FIG.1B
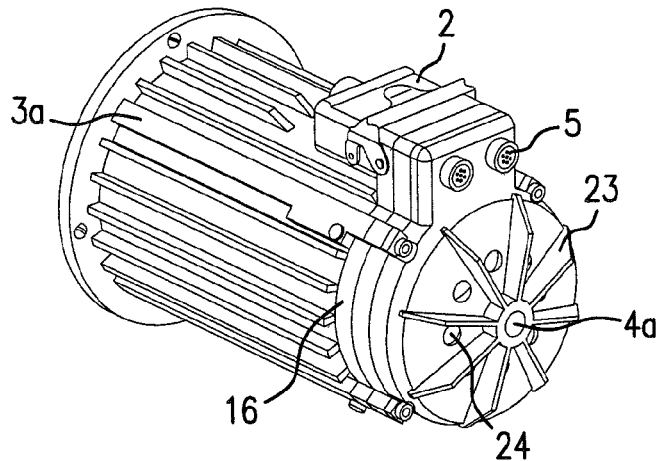
FIG.2
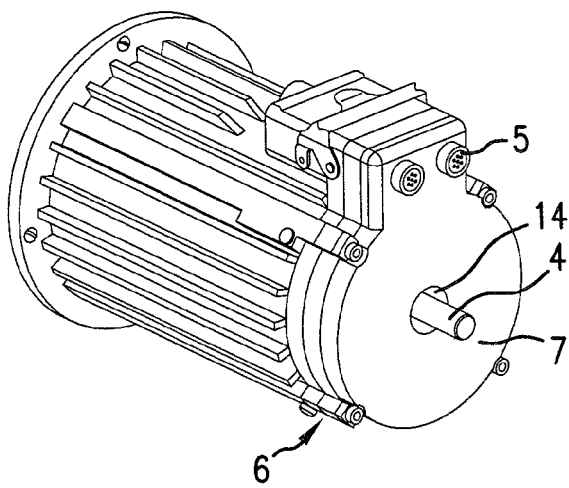
FIG.3

CONVERTER MOTOR

CROSS-REFERENCE TO A RELATED APPLICATION

The invention described and claimed hereinbelow is also described in German Patent Application DE 10 2006 047 269.1 filed on Oct. 4, 2006. This German Patent Application, whose subject matter is incorporated here by reference, provides the basis for a claim of priority of invention under 35 U.S.C. 119 (a)-(d).

BACKGROUND OF THE INVENTION

The present invention relates to an electric motor with a converter unit. Highly diverse types of motors are known from the related art. For example, standard asynchronous motors are the most common types of drives used in industry. These types of motors are inexpensive, very robust, and quiet-running. Asynchronous motors of this type have various disadvantages, however, such as a fixed speed and direction of rotation, and the fact that a separate start-up device is required. In addition, they are inefficient at partial loads, and the cos phi power factor is poor. In addition, active braking cannot be carried out with motors of this type.

To overcome these disadvantages, the trend in the related art has been to operate proven asynchronous motors with a converter that powers the motor. With the aid of this converter, basically all disadvantages may be eliminated. The trend is therefore increasing toward motors that are operated using converters.

The act of providing a converter has various disadvantages, too, such as additional costs, a greater amount of space required in the switch cabinet, the development of additional heat in the switch cabinet, and noise radiation resulting from the pulse-width modulation (PWM), and the resultant need for interference suppressor filters.

Ideally, when a converter is used, however, there is no need for (expensive) mains supply interface components, which are common with standard motors. For example, there is no need for a starting circuit-breaker or a tripping unit for temperature monitoring, or for a star/delta connection-type starter or a motor starter. Nor is there a need for a contactor combination for the pole-changing or the reversal, or for a mains contactor, when an operational voltage disconnection is not required (that is, when the converter includes an electronic starting lockout). A direct current braking device is not required, either.

Converters are therefore being used to an increasing extent in the related art, with the result that combinations of motors and converters ("converter motors") are becoming more common. A known means for achieving the object is to use a converter, which is screwed onto the motor in place of a terminal box. The motor is an unmodified, standard motor, and the converter is a separate functional unit, which may also be installed next to the motor, as an option. This combination may be connected directly to the mains, since the mains filter is integrated in the converter.

A separation is carried out in this case, in particular a thermal separation between the motor and the converter. The reason for this is to ensure that emergency operation of the motor directly from the mains may be carried out if the converter fails. Motors are therefore typically wound for mains voltage (400V, 50 Hz). The advantages of locating the converter directly on the motor are that less space is required in the switch cabinet, and heat generation is prevented. In addition, there is no need to shield the motor cable.

The disadvantage of systems of this type is that the converter unit is often just as large as the motor itself. Given low nominal power in particular, the converter is often designed to be larger than the motor itself. The reasons for this are that the converter has its own cooling system, and that the converter is connected with the motor via an intermediate housing in which the terminals are located.

Basically, heat exchange between the converter and the motor housing is prevented in the known objects by utilizing thermal decoupling. A position pick-up for regulating rotational speed or position is basically not integrated, or doing so requires high additional costs.

SUMMARY OF THE INVENTION

The object of the present invention, therefore, is to create a converter motor that requires less installation space than the existing designs. In addition, the inventive converter motor should be more cost-favorable, should enable easier electrical connections, and make it possible to regulate rotational speed using suitable sensors. A converter motor should therefore be provided that is suitable as a modern replacement for the IEC standard motors, with or without converters.

In keeping with these objects and with others which will become apparent hereinafter, one feature of the present invention resides, briefly stated, in a converter motor, comprising an electric motor having a motor shaft and a back wall; and a converter unit for controlling said electric motor, said converter unit including a plurality of control components and being located on said electric motor, said converter unit having a housing located on said back wall of said electric motor, said converter unit also including a through region through which a rear end of said motor shaft of said electric motor passes.

Another feature of the present invention resides, briefly stated, in a converter motor, comprising an electric motor having a motor shaft and a back wall; and a converter unit for controlling said electric motor, said converter unit including a plurality of control components and being located on said electric motor, said converter unit being located on said back wall of said electric motor, and said converter unit being thermally coupled with said electric motor.

A further feature of the present invention resides, briefly stated, in a converter unit for controlling an electric motor with a plurality of control components, said converter unit including a base plate locatable on a back wall of a motor housing, and an opening through which a motor shaft of the electric motor is guidable.

The inventive converter motor includes a motor shaft and a converter unit that controls the electric motor. The converter unit includes a large number of control components and is located on the electric motor. The electric motor also includes a back wall. According to the present invention, the converter unit and/or a housing of the converter unit are/is located on this back wall, and the converter unit includes an opening region, through which the rear end of the motor shaft passes. The opening region may be a through hole. It is also possible, however, that the motor shaft passes the converter unit only on the side. In this case, the opening region is the geometric region next to the converter unit, through which the shaft passes.

As an alternative to or in addition to the opening region, the converter unit is thermally coupled with the electric motor. The electric motor preferably includes a motor housing on which—or on the back wall of which—the converter unit is located. Reference will therefore also be made to the motor housing, below. Basically, however, the present invention may also be used with electric motors without housings.

Both of the inventive objects make it possible to reduce the amount of installation space and, in particular, they may be combined with each other.

The control components are preferably located in a housing, although this housing does not necessarily have to be a completely closed housing.

The converter unit is therefore located directly on the back wall, thereby making it possible to save space overall by dimensioning the converter unit and motor housing in a suitable manner. The above-mentioned combination of a standard motor with a separate converter unit is an intermediate stage established in the development of electric motors, and it is based on the strict separation of motor and converter development. The inventive approach is based on the fact that more favorable converter motors may be designed, in particular, by forming the motor and control electronics—like the converter—as a mechatronic unit.

In contrast to earlier converters, converter electronics are now so technologically advanced that they no longer affect the reliability of the electric motor. To attain vibration resistance and a long service life, for example, neither a relay nor electrolytic capacitors are installed. It is also no longer necessary to design the electric motor for a direct mains connection. Nor is it absolutely necessary for the converter to be easily replaced. It is very advantageous, however, when the motor and converter may be manufactured and tested separately, and when they may be joined easily.

Since the electric motor no longer needs to be designed for a direct mains connection, either, it is possible to select any voltage, frequency, and number of pole pairs. The design no longer must take a possible mains overvoltage into account, thereby making it possible to make better use of the iron. A run-up on mains power supply is also no longer necessary. Instead of an asynchronous motor, it is now possible to use a PM synchronous motor or a reluctance motor. Compared with asynchronous motors, these two motors have minimal rotor losses. The PM synchronous motor develops approximately 50% more continuous output. The present invention may therefore be used with all types of electric motors.

In a further preferred embodiment, the converter unit encloses the nearly entire geometric axis of the motor shaft in the circumferential direction of the geometric axis. It is therefore possible, for example, for the motor shaft itself to extend through an opening in the converter unit. The converter unit may also have a circular shape, e.g., it may be semicircular in design. This design makes a particularly space-saving design of the converter possible.

The converter unit and its housing preferably include a through hole, through which the motor shaft passes. More specifically, as mentioned above, the components of the converter unit and/or the converter are accommodated in a closed housing that is mounted behind the motor and that includes a through hole through which the motor shaft passes toward the rear. A slot or gap may be provided instead of the through hole. In this manner it is possible to remove the converter unit from the motor shaft from the side, e.g., for repair.

In a further preferred embodiment, the converter unit and its housing are thermally coupled with the motor housing. A particularly compact unit composed of motor and converter unit is also made possible in this manner. In this embodiment, the power electronics of the converter do not include their own cooling device; they are thermally coupled with the motor housing instead. The motor therefore serves as a heat sink for the electronics. The result of this is that the nominal power of the motor is somewhat lower due to the additional heat produced (e.g., 20% lower). This reduction may be compensated for, however, by extending the active part or by using a low-loss electrical sheet. The inventive converter motor is still considerably smaller than the objects known from the related art, while providing the same output.

The additional costs for the inventive motor are insignificant. Since, as mentioned above, the limitations resulting from the mains connection are eliminated, the output of the motor part may also be increased by using a suitable design. When a PM synchronous motor is used, the motor part is even smaller than the original asynchronous motor, despite the converter losses introduced.

In a further embodiment, the converter unit and its housing include an essentially flat base plate that is in direct contact with the back wall of the motor housing. In other words, the converter unit has an end surface, via which the converter unit is mounted on an end surface of the rear bearing shield of the motor. A particularly favorable heat transfer is made possible in this manner.

In a further advantageous embodiment, the converter includes a plug-in mains connection. This mains connection and the motor-side plug are integrated in the housing of the converter unit. Space may be saved in this manner as well. The converter unit is preferably electrically connected via a plug-and-socket connector with the winding of the electrical machine, i.e., the motor.

In a further advantageous embodiment, the converter unit and its housing include a metallic base plate with a high thermal conduction quotient. This base plate is located directly on the back wall of the motor housing. The heat transfer may also be improved in this manner.

The converter unit with a highly thermally conductive base plate is therefore mounted on an end surface of the motor housing, and the dissipation heat of the power electronics of the converter unit is introduced into this base plate.

In a further advantageous embodiment of the converter unit, the thermal contact with the motor housing takes place directly via the base plate of the ceramic substrate (DCB), on which the power semiconductors are located. The converter housing therefore includes an opening in the bearing surface for the DCB, so that the underside of the DCB bears directly against the motor. The DCB is preferably movable relative to the converter housing and is preloaded such that it is pressed against the end surface of the motor when the converter is installed. It is advantageous to use heat conducting paste at this point.

In a further preferred embodiment, temperature-sensitive components of the converter unit are thermally coupled with a cover, which is thermally insulated from the base plate. In this manner, the heat that develops in the power electronics may be kept away from these temperature-sensitive components of the converter unit.

In a further advantageous embodiment, a fan wheel is located on an end section of the motor shaft. Specifically, a fan wheel is provided on the end of the shaft that advantageously passes through the hole in the converter unit. The fan wheel ventilates the motor and the converter unit.

The fan wheel preferably includes a large number of through holes. Specifically, they are axial through holes in particular, which ensure that a centrifugally outwardly oriented air flow is also produced in the region of the converter cover, which is located directly in front of the fan wheel, thereby improving the cooling effect.

In a further preferred embodiment, a signal transducer is located on the motor shaft. This signal transducer is located on a section of the motor shaft that is guided through the converter unit and its housing. In other words, in the longitudinal direction of the motor shaft, the signal transducer is located in a region that is at least partially enclosed by the converter unit. Via this signal transducer, the angular position of the motor shaft may be detected in a contactless manner by at least one sensor provided in the converter unit.

Particularly preferably, the signal transducer is an annular element and, particularly preferably, a magnet that is magnetized in an alternating manner in the circumferential direction, the field of which is evaluated using magnetic field sensors in the converter unit.

In a further preferred embodiment, the signal transducer is an annular element that is integrated in a hub of the fan wheel. For this purpose, the hub of the fan wheel is extended toward the front, i.e., toward the end of the shaft. In this embodiment, therefore, the signal transducer is provided on an inner circumference of the fan wheel.

In a further preferred embodiment, a sensor element is provided that determines the temperature of at least one section of the base plate. Since the motor and the converter unit are thermally coupled, it is sufficient to provide temperature monitoring of the converter unit base plate. The dissipation heat of the power part is introduced here, and it flows into the motor housing. The base plate is therefore always hotter than the motor housing, so separate detection of the motor temperature may therefore be eliminated. To protect the motor winding in case of overload, the converter unit particularly preferably includes $I^2t$ current limiting that has been adapted to the motor.

In a further preferred embodiment, the electric motor includes a signal transducer element for the contactless detection of an angular position of the motor shaft. The sensor element is located behind the motor shaft. Specifically, the sensor element is located in the axial direction behind the motor shaft in the converter part. In this embodiment, the components of the converter unit are also located in the housing, which is mounted behind and on the back wall of the motor, and the sensor is centrally located behind the motor shaft. The sensor makes it possible to detect the angular position of the motor shaft in a contactless manner. To this end, it is possible to shape the end of the motor shaft in a particular manner or to provide it with a magnet or a dimensional standard.

In another preferred embodiment, an encoder disk is located on the motor shaft behind the converter unit, which is sampled in a contactless manner by a sensor system installed in the converter unit for the purposes of angular detection. It would also be possible, however, for this encoder disk to be mounted on the fan wheel or to be part of the fan wheel. Preferably, the angular position of the motor shaft is also detected in a contactless manner here.

In a further preferred embodiment, the converter is an inverter that is supplied with direct voltage.

The present invention is also directed toward a converter unit for an electric motor, in the case of which the converter unit includes a through hole for the passage of a motor shaft, and it includes a base plate that may be located on a back wall of an electric motor. The converter unit is preferably designed as described above.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1a shows a first view of an inventive electric motor with a converter unit, according to the invention;

FIG. 1b shows a further view of the electric motor in FIG. 1a, according to the present invention;

FIG. 2 shows the electric motor in FIG. 1a, with the fan hood removed, according to the present invention;

FIG. 3 shows the motor in FIG. 1 without the fan wheel, according to the present invention;

DESCRIPTION OF THE PREFERRED EMBODIMENTS

Figure 4:
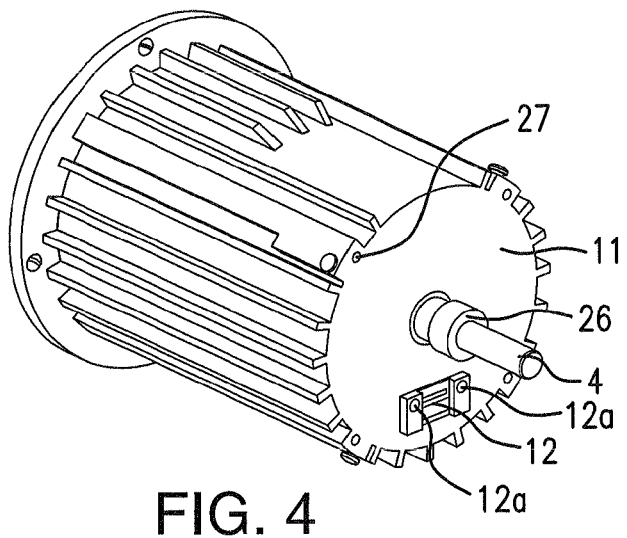
FIG. 4 shows the motor in FIG. 1a without the converter unit, according to the present invention.

FIGS. 1a and 1b show an inventive converter motor 1 with a motor housing 3, on which a converter unit 6 is located. Reference numeral 8 indicates a fan hood of the converter unit, which also includes a large number of openings in its back wall 8a, for ventilation.

The mains connection is plugged directly into converter unit 6. A socket (e.g., DESINA) is integrated in the base plate or cover 7 of converter (see FIG. 4). Plug 2 rests on motor 1 in a space-saving manner, thereby minimizing the amount of installation space required for the converter motor. The cable outlet direction of plug 2 may be adapted to the required conditions in any manner necessary by selecting the plug sleeve accordingly.

The unit composed of motor and converter unit may be designed with degree of protection IP 65. Since the converter unit has a closed housing, the only concern is to ensure that the system have a tight seal in the region of the winding termination, which may be attained, e.g., by installing an O ring on the circumference of the end face of the bearing plate of the motor.

FIG. 2 shows the converter motor in FIG. 1, with fan hood 8 removed. Reference number 23 indicates a fan wheel installed on the shaft, i.e., on end section 4a of the shaft. The fan wheel must serve its purpose regardless of the direction of rotation, which means the cover would be in the "slipstream" at least part of the time. The desired movement of air in the region of the converter cover, which is hidden by the fan wheel in FIG. 2, may be attained by the fact that the fan wheel includes axial through holes 24 near the shaft, which make possible a centrifugally outwardly oriented air flow between the cover (not shown) and the fan wheel.

Motor housing 3 includes ribs 3a for cooling.

FIG. 3 shows the converter motor in FIG. 2 with the fan wheel removed. In this figure it is clear that converter unit 6 includes a converter cover 7 that includes a through hole 14, through which motor shaft 4 extends. Reference numeral 5 indicates the terminals for the control signals.

FIG. 4 shows the converter motor in the previous figures, with the converter unit removed. Reference numeral 11 indicates the rear wall of motor housing 3, on which the converter unit is located. The inventive converter motor is equipped with a device for measuring the rotor position. Since, as mentioned above, the converter unit encloses the motor shaft, a sensor that detects the angle of rotation of motor shaft 4 in a contactless manner may be integrated in the converter unit.

A possible means of attaining the object of the present invention is to use a ring magnet 26 magnetized in an alternating manner, which serves as a signal transducer in this case. This ring magnet is mounted on the motor shaft and is located in through hole 14 of converter unit 6. Specifically, the signal transducer is a ring magnet that is magnetized in an alternating manner in the circumferential direction, is mounted on the shaft and is located in through hole 14 of converter unit 6. The magnetic field of signal transducer 26 is measured by two Hall sensors 12a located at an angle of 90° (based on the pole pitch) of the magnet. The angle of rotation may be determined using the arctan function. Hall sensors 12a are part of motorside counter plug 12, described greater detail below.

With the aid of this very robust and cost-favorable angular sensor, a field-oriented injection of the current and regulation of the rotational speed and position are made possible, thereby ensuring optimal, stable operation under all conditions, in contrast to methods that operate without sensors. This also applies, without restriction, when the motor is at a standstill and when it is being positioned. Due to the low costs associated with the inventive position measurement, sensorless control methods cannot compete, because they utilize a great deal of computing effort and result in inferior rotational speed regulation.

Figure 5:
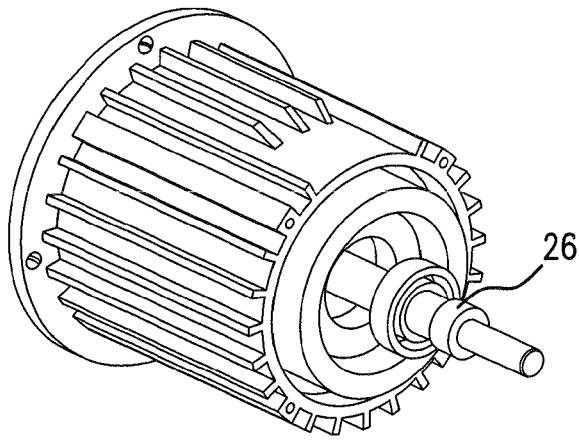
FIG. 5 shows an electric motor without the back wall or the converter unit, according to the present invention.

FIG. 5 shows a view into the interior of the electric motor, i.e., after the back wall of the electric motor—which is mounted on housing 3 and forms a single unit therewith—was removed. Reference numeral 12 in FIG. 4 indicates a motor-side counterplug for connection of the motor winding. In other words, the electrical connection of the converter unit with the motor winding is preferably a plug-in connection and is located in a through hole in converter base plate 16. As shown in FIG. 4, motor-side counterplug 12 is installed in back wall 11 and/or the rear bearing plate. This configuration also results in a further simplification of the overall design.

Figure 6:
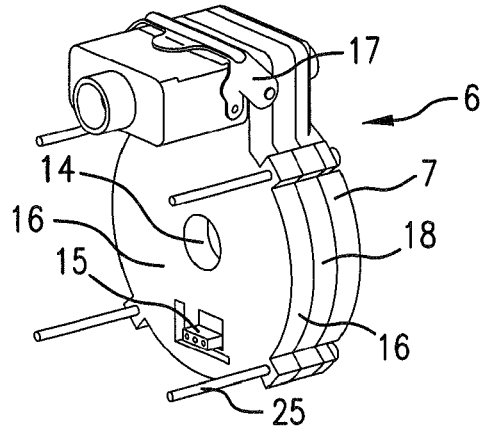
FIG. 6 shows an inventive converter unit for the electric motor, according to the present invention.

FIG. 6 shows an inventive converter unit 6. Reference numeral 14 indicates the through hole for passage of the shaft. This through hole is located in base plate 16 of converter unit 6. Reference numeral 15 indicates the plug for the converter output, which interacts with counterplug 12 of the electric motor shown in FIG. 4. Plug 15 includes a temperature sensor 28 for measuring a temperature of the back plate 16 shown in detail in FIG. 6a.

Figure 6A:
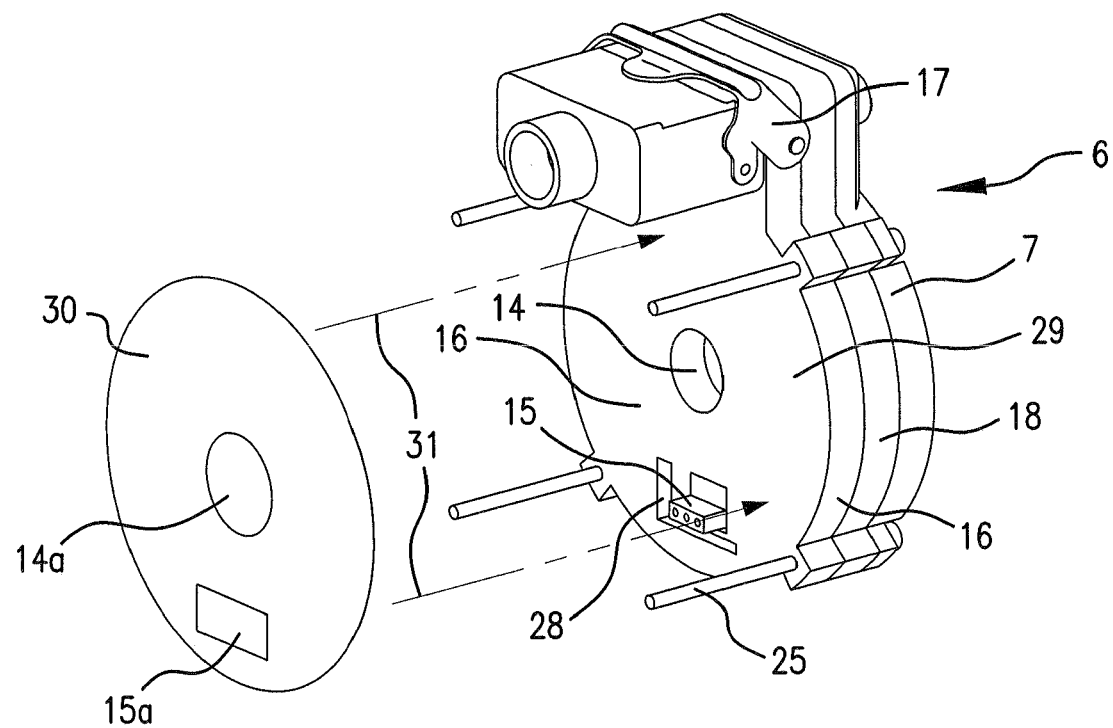
FIG. 6a shows an inventive converter unit for the electric motor, highlighting a sensor and heat conducting elements.

Converter unit 6 is therefore annular in shape, thereby enclosing motor shaft 4. It is installed on rear wall 11 (see FIG. 4) of the electric motor from behind. The desired low heat-transfer resistance between rear wall 11 and converter unit 6 is attained via flat surfaces of the back wall and base plate 16 of the converter. Heat transfer may be improved further by using heat conducting paste 29 (see FIG. 6a) or a thermally conductive foil 30 (see FIG. 6a). While the heat conducting paste 29 is shown applied to back plate 16, it also may be applied to the back wall (11) of the motor. While the thermally conductive foil 30 may comprise any shape and thickness known to those skilled in the art, it is shown in FIG. 6a to include a cutout 15a for the plug 15 and a cutout 14a for shaft 4. Arrows 31 are included to depict two alignment positions of outer circumferential edge of foil 30, and their corresponding locations on the back plate 16 when held thereagainst by the loading of the back wall 11. Arrows 11 are included for exemplary purposes only, and are not meant to be limiting. The foil is held fast and loaded against back plate 16 by screws 25, and may be utilized to maximize heat transfer with or without paste 29. The housing of the converter unit is formed in this case by base plate 16 and cover 7.

Furthermore, converter unit is located directly in the air flow of fan wheel 23 (see FIG. 2), which, as mentioned above, is preferably designed as fan wheel 23 installed on the motor shaft. Although the effect of this fan wheel is therefore dependent on the rotational speed, it is also equally effective in cooling the motor, because the motor losses (core losses)—which depend on the rotational speed—increase as the rotational speed increases. The cooling effect, which also increases as the rotational speed increases, therefore compensates for the increasing losses. The motor still delivers a usable stall torque even though there is no air flow when the motor is at a standstill. To increase the power at lower rotational speeds, a separately driven fan may be used.

As shown in FIG. 6, the inventive converter unit is divided into two zones, which are thermally insulated from each other. The power electronics, which absorb the temperature of the motor housing (e.g., up to 100° C.), are located on metallic base plate 16, which is screwed onto the motor. Cover 7, which is also preferably metallic and faces the fan, is thermally insulated from the base plate. The temperature-sensitive circuits (e.g., microprocessor, user interface, and the like) of converter unit 6 are thermally coupled internally to this cover. An intermediate piece 18 made of plastic is located between base plate 16 under cover 17; it provides the thermal insulation.

The cooling of the power electronics on converter unit 6 therefore takes place via the introduction of dissipation heat into motor housing 3 via rear wall 11. The entire surface of the motor is effective for cooling. The cooling effect of the fan may also be used primarily for the power electronics by providing the rear bearing plate or back wall 11 with as much surface area as possible, and by providing cooling ribs on the circumference. Cooling the cover 7 of the converter unit is less problematic, since relatively little dissipation heat is introduced here. Cover 7 may also be provided with cooling ribs, which extend into the air flow of the fan. A design of this type is suited in particular for connection with a separately driven fan.

Reference numeral 25 indicates a fastening screw, which is used to connect converter unit 6 with the motor. To this end, the four screws 25 shown are screwed into corresponding threaded bores 27 of the motor housing (see FIG. 4). Reference numeral 17 indicates a locking clamp for a mains plug.

In order to realize the "secure hold" functionality, converter unit 6 is advantageously equipped with an electronic start-up lock (without a relay), which reliably prevents the motor from starting up when the energy supply is switched on. When an operational voltage disconnection is not required, the start-up lock replaces the expensive mains contactor. In this case, the line fuse is sufficient.

The inventive converter motor is designed primarily to replace the previously common standard motor with the associated mains supply interface. The advantages of the inventive motor include energy savings resulting from the fact that the rotational speed is adaptable and that the magnetizing current may be reduced. In addition, the functionality may be expanded to include a variable rotational speed and direction of rotation, and the usual mains supply interfaces may be eliminated. For braking operation, active braking (DC braking) is possible in place of coasting to a standstill.

A start/stop operation with generator braking requires braking resistance—which would have to be provided separately, due to the considerable power loss, or the braking energy would have to be returned to the mains; this is possible, e.g., when the converter unit is designed as a matrix converter. Due to spacial limitations, it is assumed that direct-current braking or a comparable method, with which the braking energy in the motor winding is converted to heat, is a reasonable choice in combination with the inventive method, to limit the converter losses. When the circuit is designed accordingly, braking may also be carried out if there is a mains failure. Furthermore, the converter motor must be parametrized for the application, and expected values must be provided. The connection of the motor via a field bus continues to prevail from the related art.

It will be understood that each of the elements described above, or two or more together, may also find a useful application in other types of constructions differing from the type described above.

While the invention has been illustrated and described as embodied in a converter motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A converter motor, comprising an electric motor having a motor shaft and a back wall; and
   a converter unit for controlling said electric motor including a plurality of control components and being located on said electric motor,
   wherein said converter unit comprises a housing located on said back wall of said electric motor, said housing including a cover a substantially flat base plate arranged to be in direct contact with said back wall of said electric motor in order to facilitate heat transfer, and a through region through which a rear end of said motor shaft of said electric motor passes.

2. A converter motor as defined in claim 1, wherein said converter unit encloses substantially an entire geometrical area of said motor shaft in a circumferential direction of said motor shaft.

3. A converter motor as defined in claim 1, wherein the base plate of said converter unit is configured to have a high coefficient of heat conductivity.

4. A converter motor as defined in claim 3, further comprising a cover which is thermally insulated from said base plate, and wherein said converter unit comprises temperature-sensitive components which are thermally coupled with said cover.

5. A converter motor as defined in claim 1, wherein said housing of said converter unit has an opening that extends toward said electric motor and wherein said base plate is preloaded such that it is pressed against said back wall of said electric motor.

6. A converter motor as defined in claim 1, wherein said motor shaft has an end section, and further comprising a fan wheel located on said end section of said motor shaft.

7. A converter motor unit as defined in claim 6, wherein said fan wheel includes a plurality of openings.

8. A converter motor as defined in claim 1, further comprising a signal transducer located on a section of said motor shaft that is guided through said converter unit.

9. A converter motor as defined in claim 8, wherein said signal transducer is configured as an annular element that is mounted on said motor shaft of said electric motor.

10. A converter motor as defined in claim 8, further comprising a fan wheel located on an end section of said motor shaft, and wherein said signal transducer is configured as an annular element disposed on said motor shaft at a location to be integrated in a hub of said fan wheel.

11. A converter motor as defined in claim 8, further comprising a sensor element that determines a temperature of at least one section of an element selected from the group consisting of said base plate of said converter unit and a heat transfer element pressed against both said back wall of said electric motor and said base plate of said converter unit.

12. A converter motor as defined in claim 1, further comprising
   a signal transducer; and
   a sensor element for a contactless detection of an angular position of said motor shaft, said sensor element being positioned such that it is located in proximity of said signal transducer in said converter unit, while said signal transducer is located on and proximate to an end of said motor shaft.

13. A converter motor as defined in claim 12, further comprising an encoder disk located on said motor shaft behind said converter unit.

14. A converter motor as defined in claim 1, wherein said converter unit is configured as an inverter supplyable with direct current.

15. A converter motor as defined in claim 1, further comprising a plug-in mains connection integrated in said converter unit.

16. A converter motor as defined in claim 1, wherein the converter unit further comprises a thermally conductive foil disposed between and pressed against both said back wall of said electric motor and said base plate of said converter unit.

17. A converter motor as defined in claim 1, wherein the converter unit further comprises a heat conductive paste arranged between and contacting both said back wall of said electric motor and said base plate of said converter unit.

* * * * *